April 24, 1934.  W. E. HOLSCLAW  1,955,913
FLARING TOOL
Filed Oct. 31, 1932
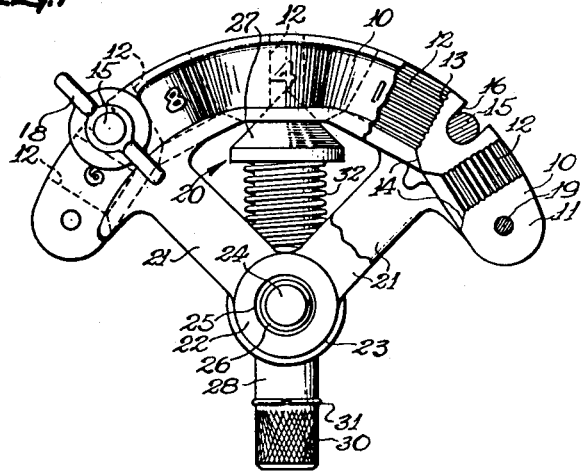
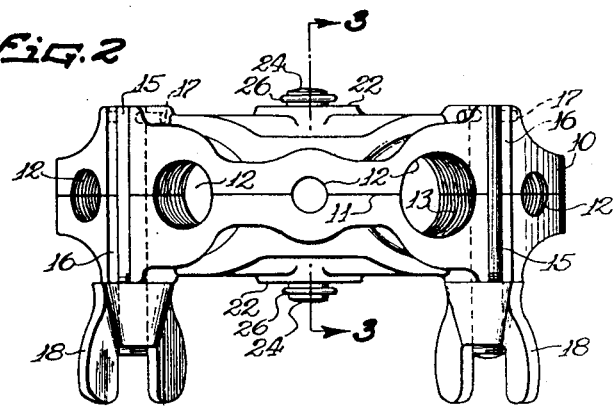
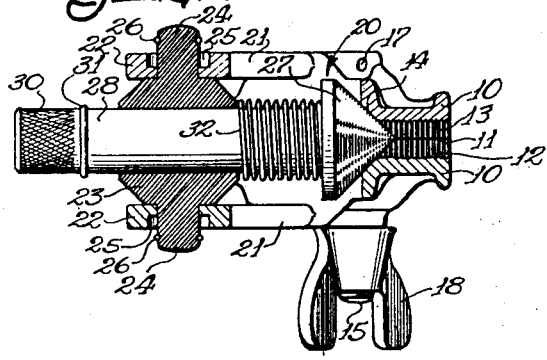
Inventor
Walter Estes Holsclaw
By Churchill Parker Carlson
Attorneys Patented Apr. 24, 1934

1,955,913

UNITED STATES PATENT OFFICE 1,955,913

FLARING TOOL

Walter Estes Holsclaw, Evansville, Ind., assignor to Holsclaw Brothers, Inc., Evansville, Ind., a corporation of Indiana Application October 31, 1932, Serial No. 640,355

9 Claims. (Cl. 153—79)

The invention relates generally to metal forming tools and more particularly to a tube flaring tool.

The general object of the invention is to provide a tool of this character which may be easily manipulated, accomplishes accurate work on various sizes of tubes, is inexpensive to manufacture, and is sturdy in construction.

More specifically, the object is to provide an inexpensive tool of this character, adapted for various sizes of tubes, which grips a tube effectively and holds it firmly while it is being flared, and which permits the easy insertion and withdrawal of the tube.

Another object is to provide a tool of this character in which the flaring member is slidably supported and adapted to be struck by a hammer.

Other objects and advantages will become apparent from the following description taken in connection with the accompanying drawing, in which:

Fig. 1 is a side view, partially in section, of a tool embodying the features of the invention.

Fig. 2 is a face view of the tool.

Fig. 3 is a section taken on the line 3—3 of Fig. 2.

The present embodiment of the invention comprises generally a pair of arcuate jaws having a plurality of pairs of complementary radial grooves for gripping various sizes of pipes, means being provided for clamping the jaws together. At the center of the arc of the jaws is a support in which is slidably mounted in a radial position a flaring member or plunger adapted to be driven into the end of a tube gripped in one of the pairs of grooves. The flaring member protrudes beyond the support and is adapted to be struck by a hammer to effect the flaring. To aline the flaring member with the various pairs of grooves, the support is pivoted relative to the jaws.

As shown in the drawing, the device comprises a pair of similar jaws 10 for gripping the tubes and having the form of an arc. Each of the jaws have a face 11 lying in a plane which includes said arc, the faces of the two jaws normally being in substantially abutting relation when gripping a tube. In said faces of the jaws are a plurality of pairs of complementary grooves 12 radially arranged relative to the arc of the jaws.

The grooves are of varying sizes to accommodate various sizes of tubes. The surface of the grooves are roughened, as by cutting shallow threads 13 therein, to effectively grip a tube, and the inner ends are flared as at 14 in a conical shape or whatever shape it is desired to give to the end of the tube.

To clamp the two jaws together to effect a gripping action on a tube, means is provided such as a pair of clamping screws 15. Preferably the screws 15 are positioned adjacent the respective ends of the jaw and are adapted to lie in slots 16 extending across the jaws. One end of each screw is pivotally secured in one jaw as by a pin 17, while the other end is threaded to receive a wing nut 18 which is adapted to bear against the outer face of the other jaw. Thus, when the wing nuts 18 are loosened, the screws 15 may be swung out of the slots in one jaw to permit separation of the two jaws. A pair of dowel pins 19 may be secured in the respective ends of one of the jaws for insertion into holes in the other jaw to assist in accurate relative positioning of the jaws.

The device also includes a flaring member, indicated generally at 20, and a support therefor which permits the flaring member to be adjusted into alinement with the respective grooves 12. To this end, each jaw has a pair of arms 21 extending radially of the arc of the jaws and terminating in a hub 22, the hubs of the respective jaws being in spaced relation to each other, the axis of the hubs including the center of the arc. Mounted between the hubs is a support 23 having reduced ends 24 pivoted in the respective hubs.

To permit adequate separation of the jaws for the insertion of a tube, the reduced ends 24 of the support 23 extend beyond the hubs when the jaws are closed, and the hubs are countersunk on their outer faces as at 25, spring retaining rings 26 being mounted on the reduced ends to prevent complete detachment of the support from the jaws. Thus, the jaws may be separated and still retain the support therewith.

The flaring member 20 is radially mounted in the support 23, and comprises a head 27, which is conical in form to conform to flared portion 14 of the grooves and is adapted to be inserted in the end of a tube when the latter is gripped in a groove 12. Extending from the head is a shank 28 which is slidably and rotatably mounted in the support 23.

The end of the shank 28 opposite the head 27 protrudes beyond the support 23 and is adapted to be struck by a hammer to drive the head into a tube and thus produce a flared end thereon. The protruding end is preferably knurled as at 30 so it may be readily grasped to swing it into alinement with the respective grooves. A spring retaining ring 31 may be placed on the shank 28 to prevent the flaring member from falling out of the support when the jaws are separated, and a coiled spring 32 may be placed on the shank to bear against the head 27 and the support 23 to hold the head 27 in the end of a tube ready for driving into the tube.

In the operation of the device, the jaws are separated by loosening the wing nuts 18 and swinging the clamping screws out of the slots 16 in one of the jaws. A tube is then inserted in the proper size groove 12, and the clamping screws and wing nuts are swung back in position to grip the tube between the jaws.

To bring the flaring member 20 into position, the knurled end 30 thereof may be grasped by the hand to draw it outwardly against the pressure of the spring 32 and the support 23 turned to bring the flaring member into alinement with the tube. When the flaring member is released from the hand, the spring 32 causes the head 27 to enter the end of the tube.

The protruding end of the shank of the flaring member may then be struck with a hammer, the member being rotated slightly between blows, if desired, until the end of the tube conforms to the shape of the flared portion 14 of the groove and the shape of the head 27. The tube can then be released by unclamping the jaws.

From the above description, it will be apparent that I have provided a tube flaring tool which is sturdy in construction, inexpensive to manufacture, and which accomplishes accurate work and may be easily manipulated.

I claim as my invention:

1. A tube flaring tool comprising, in combination, a pair of complementary arcuate jaws with a plurality of radially arranged openings for gripping various sizes of tubes, and a flaring member slidable radially of the arc of said jaws and pivotally supported concentrically with said arc.

2. A tube flaring tool comprising, in combination, a pair of complementary arcuate jaws with a plurality of openings therein for gripping various sizes of tubes, a flaring member, and a pivotal support concentric with the arc of said jaws and supporting said flaring member for radial movement relative to said arc.

3. A tube flaring tool comprising, in combination, a pair of separable jaws having abutting faces lying in the same plane, said faces being provided with a plurality of complementary radially arranged grooves for gripping various sizes of pipes, a flaring member, and a support for said member supporting said member for movement in said plane, said support being adjustable to permit alinement of said member with the various grooves.

4. A tube flaring tool comprising, in combination, a pair of arcuate jaws having a plurality of radially arranged complementary grooves for gripping various sizes of tubes, each jaw having a hub concentric with the arc of said jaws, means for rigidly clamping said jaws together, a support pivotally mounted between said hubs, and a flaring member slidably mounted in said support for movement in alinement with said grooves.

5. A tube flaring tool comprising, in combination, a pair of jaws having a plurality of radially arranged complementary grooves for gripping various sizes of tubes, means for clamping said jaws together, a support having its ends pivotally mounted in the respective jaws at the center of the radii through the grooves, and a flaring member mounted in said support and movable into alinement with the various grooves by the pivotal movement of said support.

6. A tube flaring tool comprising, in combination, a pair of arcuate jaws having substantially abutting faces lying in a plane including said arc with complementary radial grooves formed in said faces for various sizes of tubes, means for clamping said jaws together, said jaws respectively having hubs rigid therewith spaced relative to each other and concentric with the arc of said jaws, a support pivotally mounted between and concentric with said hubs, and a flaring member slidably mounted in said support for movement in said plane and for adjustment by the movement of said support into alinement with the various grooves.

7. A tube flaring tool comprising, in combination, a pair of arcuate jaws positioned in face-to-face relation and having a plurality of complementary radial grooves for gripping various sizes of pipes, means adjacent the respective ends of said jaws for clamping them together, each jaw having a pair of radial arms terminating at the center in a hub, a support pivoted at its ends in the respective hubs, and a flaring member slidably and rotatably mounted in said support for alinement with the various grooves.

8. A tube flaring tool comprising, in combination, a pair of arcuate jaws having flat faces in face-to-face relation with a plurality of complementary radial grooves for gripping various sizes of pipes, each of said grooves having a roughened surface and a flared portion at its inner end, means for clamping said jaws together, a support pivotally mounted in said jaws at the center of the arc thereof, a flaring member mounted in said support radially of said arc, said flaring member comprising a conical head adapted to be driven into the end of a tube to shape it against the flared portion of the groove and a shank slidably and rotatably mounted in said support, the end of said shank opposite said head extending beyond said support so that it may be struck with a hammer, and a coil spring surrounding said shank and bearing against said head and said support and tending to hold said head in the proper position to be struck.

9. A tube flaring tool comprising, in combination, means having a plurality of positions for gripping various sizes of tubes and having a pair of spaced arms extending therefrom, a support mounted on the free ends of said arms, a flaring member having a shank mounted in said support for sliding movement in the direction of the tubes, said support being adjustable relative to said arms to move said member from one tube position to another, said member having a head adapted to be driven into the ends of the tubes, and a coil spring surrounding the shank of the member and bearing against said head and said support to hold said member in the end of a tube in position to be struck by a hammer.

WALTER ESTES HOLSCLAW.